US007886068B1

(12) United States Patent
Rao et al.

(10) Patent No.: US 7,886,068 B1
(45) Date of Patent: Feb. 8, 2011

(54) MANAGEMENT OF STREAMING MEDIA PLAYLISTS

(75) Inventors: Anureita Rao, Bangalore (IN); Mohit Gupta, Bangalore (IN)

(73) Assignee: Network Appliance, Inc., Sunnyvale, CA (US)

( * ) Notice: Subject to any disclaimer, the term of this patent is extended or adjusted under 35 U.S.C. 154(b) by 1025 days.

(21) Appl. No.: 11/262,370

(22) Filed: Oct. 27, 2005

(51) Int. Cl.
G06F 15/16 (2006.01)
(52) U.S. Cl. ...................... 709/231; 709/203
(58) Field of Classification Search ............. 709/231, 709/203, 210–219; 711/118–146
See application file for complete search history.

(56) References Cited

U.S. PATENT DOCUMENTS

| | | | | | |
|---|---|---|---|---|---|
| 5,892,915 | A | * | 4/1999 | Duso et al. ............... | 709/219 |
| 5,909,695 | A | * | 6/1999 | Wong et al. ............... | 711/133 |
| 6,389,462 | B1 | * | 5/2002 | Cohen et al. .............. | 709/218 |
| 6,526,411 | B1 | * | 2/2003 | Ward ........................ | 707/102 |
| 6,742,082 | B1 | * | 5/2004 | Lango et al. .............. | 711/118 |
| 6,813,690 | B1 | | 11/2004 | Lango et al. | |
| 6,928,442 | B2 | * | 8/2005 | Farber et al. .............. | 1/1 |
| 7,089,331 | B1 | * | 8/2006 | Gollapudi et al. ......... | 709/247 |
| 7,409,464 | B2 | * | 8/2008 | Jansson et al. ............ | 709/246 |
| 7,496,678 | B2 | * | 2/2009 | Yadav et al. .............. | 709/231 |
| 7,509,404 | B2 | * | 3/2009 | Agrawal et al. ........... | 709/223 |
| 7,574,451 | B2 | * | 8/2009 | Burges et al. ............. | 1/1 |
| 2002/0107877 | A1 | * | 8/2002 | Whiting et al. ........... | 707/204 |
| 2003/0018966 | A1 | * | 1/2003 | Cook et al. ............... | 725/2 |
| 2003/0028505 | A1 | * | 2/2003 | O'Rourke et al. ......... | 707/1 |
| 2003/0088689 | A1 | * | 5/2003 | Alexander et al. ........ | 709/232 |
| 2003/0110272 | A1 | * | 6/2003 | du Castel et al. ......... | 709/229 |
| 2003/0221013 | A1 | * | 11/2003 | Lockwood et al. ........ | 709/231 |
| 2003/0236906 | A1 | * | 12/2003 | Klemets et al. ........... | 709/231 |
| 2004/0003101 | A1 | * | 1/2004 | Roth et al. ................ | 709/231 |
| 2004/0078383 | A1 | * | 4/2004 | Mercer et al. ............. | 707/102 |
| 2004/0098539 | A1 | * | 5/2004 | Frank ....................... | 711/118 |
| 2004/0158579 | A1 | * | 8/2004 | Gopalakrishnan ........ | 707/104.1 |
| 2004/0186733 | A1 | * | 9/2004 | Loomis et al. ............ | 704/278 |
| 2004/0210604 | A1 | * | 10/2004 | Li et al. ................... | 707/104.1 |
| 2004/0249965 | A1 | * | 12/2004 | Huggins et al. ........... | 709/231 |

(Continued)

FOREIGN PATENT DOCUMENTS

WO    WO2004077221    * 10/2004

OTHER PUBLICATIONS

"Providing Personalized Ads Based on General Information", Retrieved on Oct. 27, 2005, from http://msdn.microsoft.com/library/default.asp?url=/library/en-us/wmsrvsdk/htm/personaladsgenlinfo.asp.

(Continued)

*Primary Examiner*—Joseph E Avellino
*Assistant Examiner*—Catherine Thiaw
(74) *Attorney, Agent, or Firm*—Blakely, Sokoloff, Taylor & Zafman LLP

(57) ABSTRACT

Various methods and apparatuses for storing a streaming media data play list in a cache memory are described. A streaming media data play list comprises a plurality of streaming media data entries associated with a single data pointer and the streaming media data entries comprise header data and payload data. In particular embodiments, a method for storing a streaming media data play list in a cache memory comprises receiving the streaming media data play list from a streaming media server, and storing the media data in the cache memory.

21 Claims, 9 Drawing Sheets

U.S. PATENT DOCUMENTS

| | | | | |
|---|---|---|---|---|
| 2004/0260786 A1* | 12/2004 | Barile | | 709/217 |
| 2006/0095749 A1* | 5/2006 | Nancekievill | | 712/240 |
| 2006/0155672 A1* | 7/2006 | Lee et al. | | 707/1 |
| 2006/0212668 A1* | 9/2006 | Furukawa et al. | | 711/162 |
| 2007/0074096 A1* | 3/2007 | Lee et al. | | 715/500 |
| 2008/0133453 A1* | 6/2008 | Indeck et al. | | 707/1 |

OTHER PUBLICATIONS

"Providing Personalized Ads Based on Customer Information", Retrieved on Oct. 27, 2005 from http://msdn.microsoft.com/library/default.asp?url=/library/en-us/wmsrvsdk/htm/personaladscustominfo.asp.

"Server-Side Playlists", Retrieve on Oct. 27, 2005, from http://msdn.microsoft.com/library/default.asp?url=/library/en-us/wmsrvsdk/htm/svrsideplaylists.asp.

"Programming Playlists", Retrieve on Oct. 27, 2005, from http://msdn.microsoft.com/library/default.asp?url=/library/en-us/wmsrvsdk/htm/programmingplaylists.asp.

"Playlist Elements", Retrieve on Oct. 28, 2005, from http://msdn.microsoft.com/library/en-us/wmsrvsdk/htm/playlistelemnts.asp?frame=true.

"Playlist Attributes", Retrieve on Oct. 28, 2005, from http://msdn.microsoft.com/library/en-us/wmsrvsdk/htm/playlistattributes.asp?frame=true.

"XML Entity Reference", Retrieve on Oct. 28, 2005, from http://msdn.microsoft.com/library/en-us/wmsrvsdk/htm/xmlentityref.asp?frame=true.

* cited by examiner

Logical Presentation

| Session Description |
| :---: |
| 250 |

Logical Stream 260:
    Encoding 1

| Object 0 | Object 1 | Object 2 | . . . | Object N |
| :---: | :---: | :---: | :---: | :---: |
| 280 | 280 | 280 | 280 | 280 |

Logical Stream 270:
    Encoding 2

| Object 0 | Object 1 | Object 2 | . . . | Object N |
| :---: | :---: | :---: | :---: | :---: |
| 280 | 280 | 280 | 280 | 280 |

<Reserved String>:<URL>/header
402      404      406

<Reserved String>:<URL>-<Validator>/header
402      404      416      406

<Reserved String>:<URL>-<SSKey>-<Validator>/Storage
402      404      422      416      424

<Reserved String>:<URL>-<SSKey>-<Validator>/<Object#>
402      404      422      416      432

FIG. 12

MANAGEMENT OF STREAMING MEDIA PLAYLISTS

FIELD

At least one embodiment of the present invention pertains to data caching, and more particularly, to caching streaming media data playlists.

BACKGROUND

The advent of communication networks such as the Internet has enabled users to access data stored by one or more servers coupled to the communication networks. The data may be stored in files on the servers and may be accessed by users using client systems coupled to the servers via one or more communication networks. The term "client" or "client system" is intended to refer to any computer system or like mechanism which is used by a user to request information or data stored by a server system or to request a service provided by a server system. The term "server" or "server system" is intended to refer to any computer system or like mechanism that stores information and provides the information in response to a user request received from a client computer, and/or provides some service. A particular computer system may function both as a client and as a server.

One use of the Internet is to allow users to access remotely stored content, such as documents and multimedia. To do so, typically a person operates a client system to access content on a remote origin server over the Internet. The client system may be, for example, a personal computer (PC) or a hand-held device such as a personal digital assistant (PDA) or cellular telephone. The client system normally includes a software application known as a browser, which can provide this functionality. A user of the client system typically operates the browser to locate and select content stored on the origin server, such as a web page or a multimedia file. In response to this user input, the browser sends a request for the content over the Internet to the origin server on which the content resides. In response, the origin server returns a response containing the requested content to the client, which outputs the content in the appropriate manner (e.g., it displays the web page or plays the audio file). The request and response may be communicated using well-known protocols, such as transmission control protocol/Internet protocol (TCP/IP) and hypertext transfer protocol (HTTP).

The data stored by an origin server may include media data, including streaming media data. The term "media data" is intended to include any of various types of data, including audio data, video data, image data, and other types of data and combinations thereof. The term "streaming media data" is generally used to refer to media data intended to be transported at a select (often, subscribed) bit rate, and with a desired timeliness. Streaming media generally data conforms to a real-time delivery protocol, such as, e.g., Real Time Streaming Protocol (RTSP), Real-Time Transport Protocol (RTP), etc. Streaming media data may also refer to data that may be contained in files stored by a media server that begin playing while the files are being transmitted over the network to a media player executing on a client system. This is in contrast to conventional data files that must be downloaded entirely to a client system before the user can view/play them using the client system. Streaming media may comprise a combination of video data, audio data, image data, interactive media data, animation data, panoramic data, executable files, presentation data, applet data, data files and other types of data in an integrated form. Streaming media data typically has a publishing point type of broadcast or on-demand and a content type of all video on-demand, all live, or mixed on-demand and live.

It is often desirable to cache network content in a device on the network that is located logically between the clients and the origin servers. The main purpose of caching content in this way is to reduce the latency associated with servicing content requests from clients. Storing certain content locally in the cache avoids the necessity of having to forward every content request over the network to the corresponding origin server and having to wait for a response. Instead, if the cache or caching server receives a request for content that it has cached, it simply provides the requested content to the requesting client (subject to any required authentication and/or authorization) without involving the origin server. An example of a device which has this functionality is the NetCache® product designed and manufactured by Network Appliance, Inc. of Sunnyvale, Calif. NetCache® is a registered trademark of Network Appliance, Inc.

Thus, caching servers may be used to reduce the time required to provide the requested data to the clients. Typical file caching methods include a cache receiving a file from an origin sever, such as a file server, and storing the file. Later, when a user requests data stored by the file, instead of serving the file from the file server, the file is served from the cache. Because the cache is typically a server that is closer to the client and/or has a higher bandwidth than the file sever, the file is served to the client quickly from the cache.

Data pointers and/or data references are typically provided to enable users to access the stored data. For example, in the World Wide Web ("Web") environment, a user may access data stored in a particular file by selecting a Uniform Resource Locator (URL) associated with the particular file. Using a client system, the user may configure a data request by selecting a URL using a program such as a browser or a multimedia player executing on the client system. In response to the data request, data corresponding to the user-selected URL may be communicated to the client system and output to the user. Typically, each URL refers to a single piece of streaming content.

Origin servers also support "server side playlists" (SSPs), which are lists of media content that are visible to a player as a single URL. A player is a client side software and/or hardware component that is used to play or render media data. When a player requests a URL of an SSP, the origin server streams a first entry in the list to the player. An entry is a media element in an SSP. Thus, an entry can be a media file, live encoder feed, and so forth. When the first entry is rendered, the origin serves the next entry to the player and so on. An SSP may have content of various types and of various publishing point types. For instance, an SSP having on-demand content type and on-demand publishing type, referred to herein as an "on-demand SSP," typically provides a user with control over the content in the SSP. Accordingly, the user can perform such operations as fast forward, rewind, skip to another entry, seek, and pause. An SSP having live content type and broadcast publishing type, referred to herein as a "live SSP," typically provides a user with less control over the content in the SSP. The user receives the broadcast stream as dictated by the SSP. An example of a live SSP is a broadcast stream of a football game as it happens. An SSP having an on-demand publishing point that also contains live content or an SSP having a broadcast publishing point that also contains on-demand content is referred to herein as a "mixed SSP." An example of a mixed SSP is a broadcast stream of a football game as it happens with on-demand advertisements.

Caching servers associate a URL or other data pointer to each piece of streaming content that is cached. Thus, caching servers cannot split or serve or otherwise manage streaming media playlists associated with a single URL.

SUMMARY OF THE INVENTION

The present invention includes a method and apparatus for storing a streaming media data play list in a cache memory. A streaming media data play list comprises a plurality of streaming media data entries associated with a single data pointer. The streaming media data entries comprise header data and payload data. In particular embodiments, a method for storing a streaming media data play list in a cache memory comprises receiving the streaming media data play list from a streaming media server, and storing the media data in the cache memory.

In another embodiment, a method for serving a streaming media data playlist including a plurality of streaming media entries from a cache memory includes retrieving media data from associated with the single data pointer the cache memory and serving the media data to a client.

Other aspects of the invention will be apparent from the accompanying figures and from the detailed description that follows.

BRIEF DESCRIPTION OF THE DRAWINGS

One or more embodiments of the present invention are illustrated by way of example and not limitation in the figures of the accompanying drawings, in which like references indicate similar elements and in which:

FIG. 4 illustrates a data format hierarchy according to an embodiment of the present invention;

FIG. 9 depicts a string generated to retrieve header data according to an embodiment of the present invention;

FIG. 10 depicts a string generated to retrieve a validator according to an embodiment of the present invention;

FIG. 11 depicts a string generated to retrieve a session description according to an embodiment of the present invention; and FIG. 12 depicts an object name string generated for a session data object according to an embodiment of the present invention.

DETAILED DESCRIPTION

Various methods and apparatuses for storing a streaming media data play list in a cache memory are described. A streaming media data play list includes multiple streaming media data entries associated with a single data pointer, such as a URL. Accordingly, a single data pointer can be used to access the streaming media data playlist. The media data playlists include any of various types of data, including audio data, video data, image data, and other types of data and combinations thereof. The methods described are advantageous in that a single URL can be used to cache or split an entire SSP. Streaming server behavior is duplicated on the cache, such that when an SSP URL is accessed from the cache, the client sees the same behavior as would be seen when streaming directly from the streaming server. Also, only one disk lookup is required to get to the file header of a non-SSP. Adding indication of behavior patterns in an SSP to on-disk lookup keys ensures that correctness in the streaming order is achieved at minimal cost from a performance point of view. Further, in case of a loop in an SSP, data is not duplicated on the cache.

Figure 1:
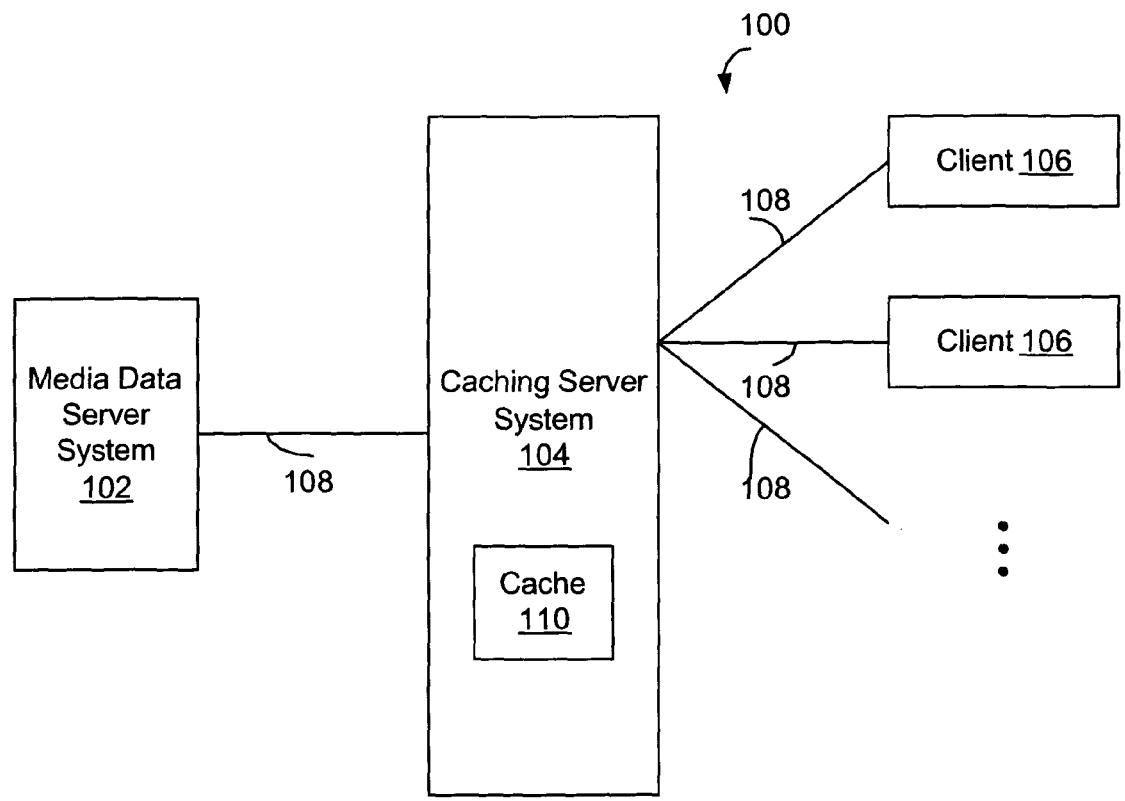
FIG. 1 is a high-level block diagram of a network system that may incorporate an embodiment of the present invention.

FIG. 1 is a high-level block diagram of a network system 100 that may incorporate an embodiment of the present invention. As shown, network system 100 comprises a number of computer systems including a media data server system 102, a caching server system 104, and a plurality of client systems 106 coupled to each other via communication links 108. Network system 100 depicted in FIG. 1 is merely illustrative of an embodiment incorporating the present invention and does not limit the scope of the invention as recited in the claims.

Communication links 108 may be conventional links, optical links, satellite or other wireless communications links, wave propagation links, or any other mechanisms for communication of information. Various communication protocols may be used to facilitate communication between the various systems shown in FIG. 1. These communication protocols may include TCP/IP protocol, HTTP protocols, extensible markup language (XML), wireless application protocol (WAP), vendor-specific protocols, customized protocols, and others. Communication links 108 may also represent communication paths through interconnected computer networks, intermediary devices, switches, routers, other communication links, and the like. The computer networks may include the Internet, local area networks (LANs), wide area networks (WAN), wireless networks, intranets, private networks, public networks, switched networks, and the like.

For the embodiment depicted in FIG. 1, a user may use a client system 106 to request SSP media data stored by media data server 102. For purposes of describing the invention, it is assumed that the user requests streaming SSP media data stored by media data server 102. As described above, various applications executing on client system 106 may facilitate configuration of the data requests. These applications may include browsers, multimedia players, and the like. For example, a data request may take the form of a user clicking a particular URL on a web page displayed by a browser, or the like. Client systems 106 are also configured to receive SSP media data, including streaming SSP media data, in response to the data requests and to output the requested SSP media data to the user.

A data request from a client system may be communicated to media data server 102 or to caching server 104. According to an embodiment of the present invention, the data request may be intercepted by an intermediary network device such as a router (which may be embodied as a Layer 4 or Layer 7 switch, a Web Cache Coordination Protocol (WCCP) router, or any other switch or router). The intermediary network device may be configured to recognize a data request requesting SSP media data. When the intermediary network device identifies such a request, the data request may be redirected to caching server 104 instead of media data server 102. Client system 106 need not be aware that the data request is routed to caching server 104 instead of media data server 102. This method is sometimes referred to as "transparency" or "transparent caching".

Media data server 102 is configured to store SSP media data, including streaming SSP media data that may be requested by client systems 106. For example, media data server 102 may store SSP media data associated with one or more URLs. The SSP media data may be stored in the form of media files. Media data server 102 may also store information (referred to as "SSP header data" or "SSP media data description information") describing characteristics or attributes of the stored SSP media data. Media data server 102 is configured to receive data requests, either from caching server system 104 or from client systems 106, to determine SSP media data corresponding to the data requests, and to forward the SSP media data corresponding to the data requests to the requesting systems.

For example, media data server 102 may receive, either from client system 106 or from caching server 104, a data request requesting an SSP associated with a particular URL. In response to receiving the data request, media data server 102 may determine the SSP corresponding to the particular URL and communicate the SSP to the requesting computer system. The streaming SSP media data may be communicated to the requesting computer system in various formats including a file format, streaming packets format, and the like. Various streaming media protocols may be used to stream SSP media data to the requesting systems including Microsoft Media Streaming (MMS) protocol, Real Time Streaming Protocol (RTSP), and the like.

As shown in FIG. 1, caching server system 104 is deployed in the network path between clients 106 and media data server 102 and is configured to implement caching methods which serve data to client systems 106 in a fast and efficient manner. Caching server 104 is configured to receive SSP media data requests from client systems 106 or from an intermediate device as described above. Upon receiving a data request, caching server 104 determines if the SSP media data requested by the data request is stored or cached by the caching server. If the requested data is cached by caching server 104 (i.e., a cache hit), the cached data is communicated to the requesting client system. If caching server 104 determines that the requested data is not cached by caching server 104 (i.e., a cache miss), caching server 104 requests the data corresponding to the data request from media data server 102 and then delivers the data to the requesting client system, while caching the data. The cached data is then available for subsequent data requests from clients.

There are various ways in which caching server 104 may receive SSP media data to be cached. According to a caching service model, cache 110 of caching server system 104 is populated as a result of data requests received from client systems 106. According to this particular embodiment, if caching server system 104 determines that SSP media data requested by a data request received from a client system 108 is not stored in cache 110 (i.e., a "cache miss"), caching server system 104 obtains the requested SSP media data from media data server 102 and delivers the SSP media data to the requesting client system 108, while caching the SSP media data. The cached SSP media data is then available for subsequent data requests. As described above, if the requested SSP media data is stored in the cache 110 (i.e., a "cache hit"), caching server system 104 can resolve the data request from its cache 110 rather than having to fetch the requested SSP media data from media data server 102. The requested SSP media data is retrieved from cache 110 and communicated to the client system 108 that was the source of the data request.

According to an alternative embodiment, cache 110 of caching server system 104 may be populated when the caching server system 104 may initiate "pre-filling" in response to an administrative command. SSP media data may also be pushed from a computer system or device that is not acting as a SSP media data server. These systems are sometimes referred to as "content mover systems." A content mover system may receive SSP media data from media data server 102 or from another content mover system and push the SSP media data to caching server 104. In a specific embodiment, a content mover system and a SSP media data server may share the same back-end storage system storing the SSP media data file. SSP media data may also be pushed from one caching server system to another.

Figure 2:
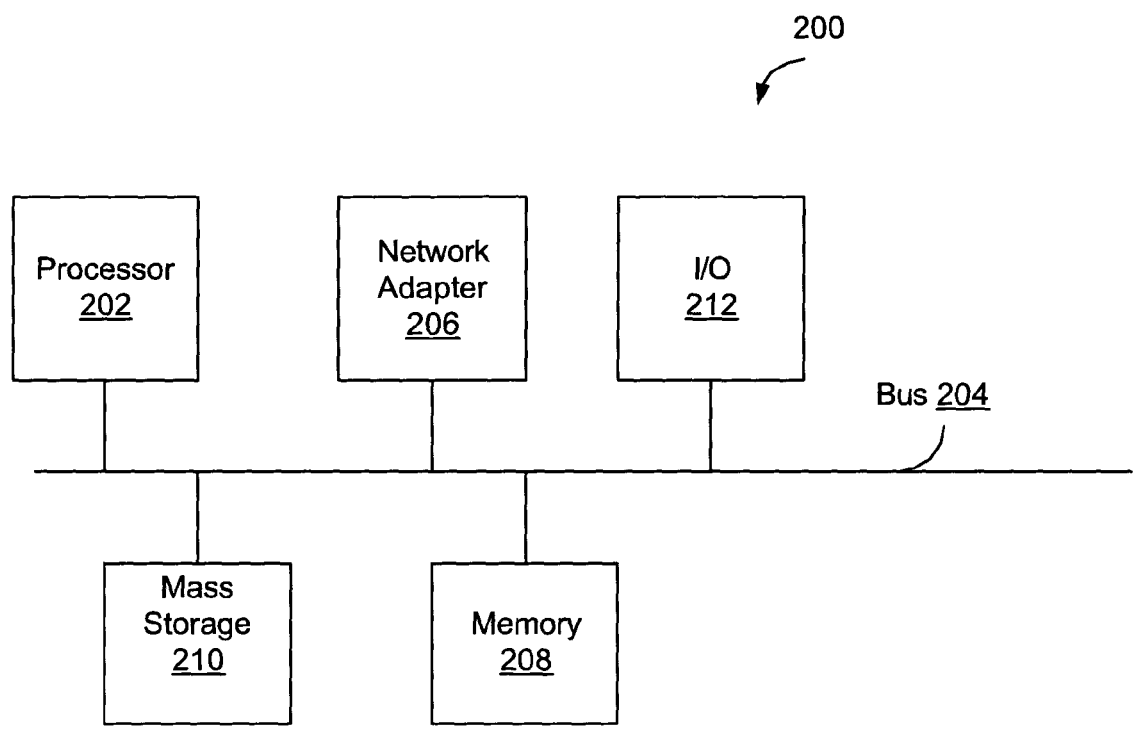
FIG. 2 is a high-level block diagram of a computer system according to an embodiment of the present invention.

FIG. 2 is a high-level block diagram showing an example of the architecture of a processing system, at a high level, in which such software can be embodied. In certain embodiments, the processing system 200 is a caching server, such as caching server system 104 in FIG. 1. In other embodiments, the processing system 200 is a separate network server or other form of processing system. Note that certain standard and well-known components which are not germane to the present invention are not shown.

The processing system 200 includes one or more processors 202 and memory 208, coupled to a bus system 204. The bus system 204 shown in FIG. 2 is an abstraction that represents any one or more separate physical buses and/or point-to-point connections, connected by appropriate bridges, adapters and/or controllers. The bus system 204, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 202 are the central processing units (CPUs) of the processing system 200 and, thus, control its overall operation. In certain embodiments, the processors 202 accomplish this by executing software stored in memory 208. A processor 202 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 208 represents any form of random access memory (RAM), read-only memory (ROM), flash memory, or the like, or a combination of such devices. Memory 208 includes the main memory of the processing system 200. Memory 208 may store software which implements the techniques introduced below. These and/or mass storage 210 and/or main memory may form the cache 110. The processing system 200 may also have a storage adapter, such as a Fibre Channel or small computer system interface (SCSI) to connect to external mass storage devices.

Also connected to the processors 202 through the bus system 204 are one or more internal mass storage devices 210; and a network adapter 206. Internal mass storage devices 210 may be or include any conventional medium for storing large volumes of data in a non-volatile manner, such as one or more magnetic or optical based disks. The network adapter 206 provides the processing system 200 with the ability to communicate with remote devices (e.g., clients 106) over a network and may be, for example, an Ethernet adapter, a Fibre Channel adapter, or the like. The processing system 200 may also include one or more input/output (I/O) devices 212 coupled to the bus system 204. The I/O devices 212 may include, for example, a display device, a keyboard, a mouse, etc.

Due to the constantly evolving nature of computers and networks, the description of computer system 200 depicted in FIG. 2 is intended only as a specific example for purposes of illustrating the preferred embodiment of the computer system. Other configurations of a computer system are possible having more or fewer components than the computer system depicted in FIG. 2.

Figure 3:
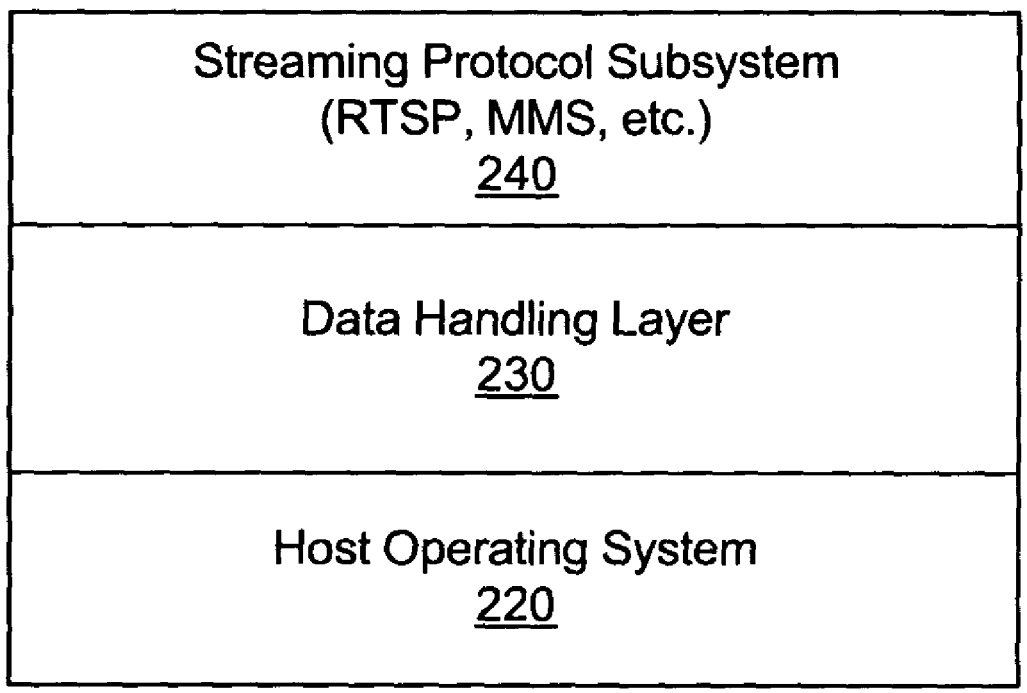
FIG. 3 illustrates a software hierarchy according to an embodiment of the present invention.

FIG. 3 illustrates a software hierarchy of software that runs in the caching server system 104 according to certain embodiments of the present invention. In particular, FIG. 3 includes a three-tiered hierarchy including an operating level 220, a data handling level 230, and a protocol level 240. According to certain embodiments of the present invention, operating system level (layer) 220 may include software provided by the assignee of the present invention: Data ONTAP®, a Network Appliance brand operating system. Additionally, network communications using Transmission Control Protocol (TCP) and UDP are also supported at operating system level 220. Of course other types of operating systems can also be used.

As illustrated in FIG. 3, data handling level (layer) 230 receives streaming media data packets and creates a series of specialized data objects for storing the data. Further, the data handling level (layer) 230 retrieves the specialized data objects from the file system and may store the data packets into a buffer for output as streaming media. According to certain embodiments, the data handling level 230 implements the techniques of the invention, as discussed in reference to FIGS. 4-11.

The protocol level 240 formats the packets according to the desired streaming protocol. According to certain embodiments of the present invention, the protocol level 250 includes support for at least one, but typically for more than one streaming media protocols. The support includes encoding of data to form streams of streaming media and decoding of streams of streaming media. In one example, a streaming media protocol is the Microsoft Media Streaming (MMS) protocol. By supporting the MMS protocol, streams of MMS formatted data can be received from a streaming media (upstream or origin) server and the streamed (payload) data can be retrieved. This payload data can be sent to data handling layer 230 for storage. Additionally, payload data can be encoded into streams of MMS data, which are then sent to data handling level 230 for paced delivery to a client system. In another example, a streaming media protocol is the Real Time Streaming Protocol (RTSP). In other embodiments, other types of streaming media encoding schemes may be supported.

Figure 5:
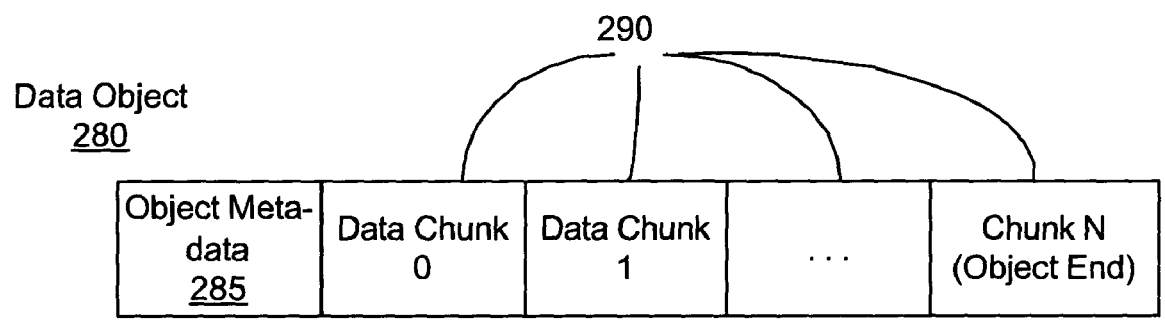
FIG. 5 illustrates a data format hierarchy according to an embodiment of the present invention.

FIGS. 4 and 5 illustrate a data format hierarchy used to cache data according to certain embodiments of the present invention. In particular, FIGS. 4-5 illustrate an internal storage structure/format used by embodiments for storing data that will be streamed to client systems.

FIG. 4 illustrates a session description 250 (stored in a session data file or session data object) and logical streams of data 260 and 270 according to an embodiment. Logical stream 260 represents data for streaming media encoded in a first encoding scheme and logical stream 270 represents data for streaming media encoded in a second encoding scheme. Each of the encodings of the data may be considered separate streams of data and are stored separately.

For FIG. 4, session description 250 may include a description of the various streams of data stored in logical streams 260 and 270. The description may include an enumeration of the various encoding schemes (e.g. 56 Kbps, 128 Kbps, ISDN), copyright and authoring data, presentation or playtime (duration) of the stream, version data, and so forth.

Logical streams of data such as logical stream 260 are made up of a series of data objects 280. Data objects 280 are physically separate files that are directly accessible, independent of other data objects 280, e.g., through use of a cache entry hash table. Data objects 280 together store the "media payload" provided by streaming media encoded in a given encoding scheme. For example, the media payload may include the actual media data included in streaming media packets for a 56 Kbps stream, or the like. More particularly, data objects 280 store the media payload that has been converted from the format in which the origin servers stores the media data into the network format for transmission to the client system and the cache. Accordingly, the data objects include data that are optimized for delivery to the client system (e.g., encapsulated in network protocol).

Each data object 280 may be used to store data having an associated and/or a predetermined amount of play time (duration). That is, each data object 280 may be used to store media payload data that will be output as streaming data that will be played on a client system for a specific amount of time or duration. For example, in one embodiment, each data object 280 is used to store data that will be streamed to a client as 20 seconds of a music stream, video stream, or the like. Alternatively, each data object 280 may store a media payload (data) having different duration, such as less than or equal to approximately 5 seconds, 10 seconds, 20 seconds, 30 seconds, 1 minute, or the like.

FIG. 5 illustrates the details of a data object according to an embodiment of the present invention. A data object 280 includes object header data portion 285, and data chunks 290. Object header data portion 285 may be used to store data object 280. Such header data, or media data description data, may include file format version numbers, the number of data chunks 290 stored, the beginning presentation time and ending presentation time for data objects, and so forth. In other embodiments, additional data may be stored in object header data portion 285 such as the data object number, protocol-specific per-data object data, a total number of bytes of payload and description data per data object, the number of data packets per data object, any end of stream indicators, checksum bits and the like.

Figure 6:
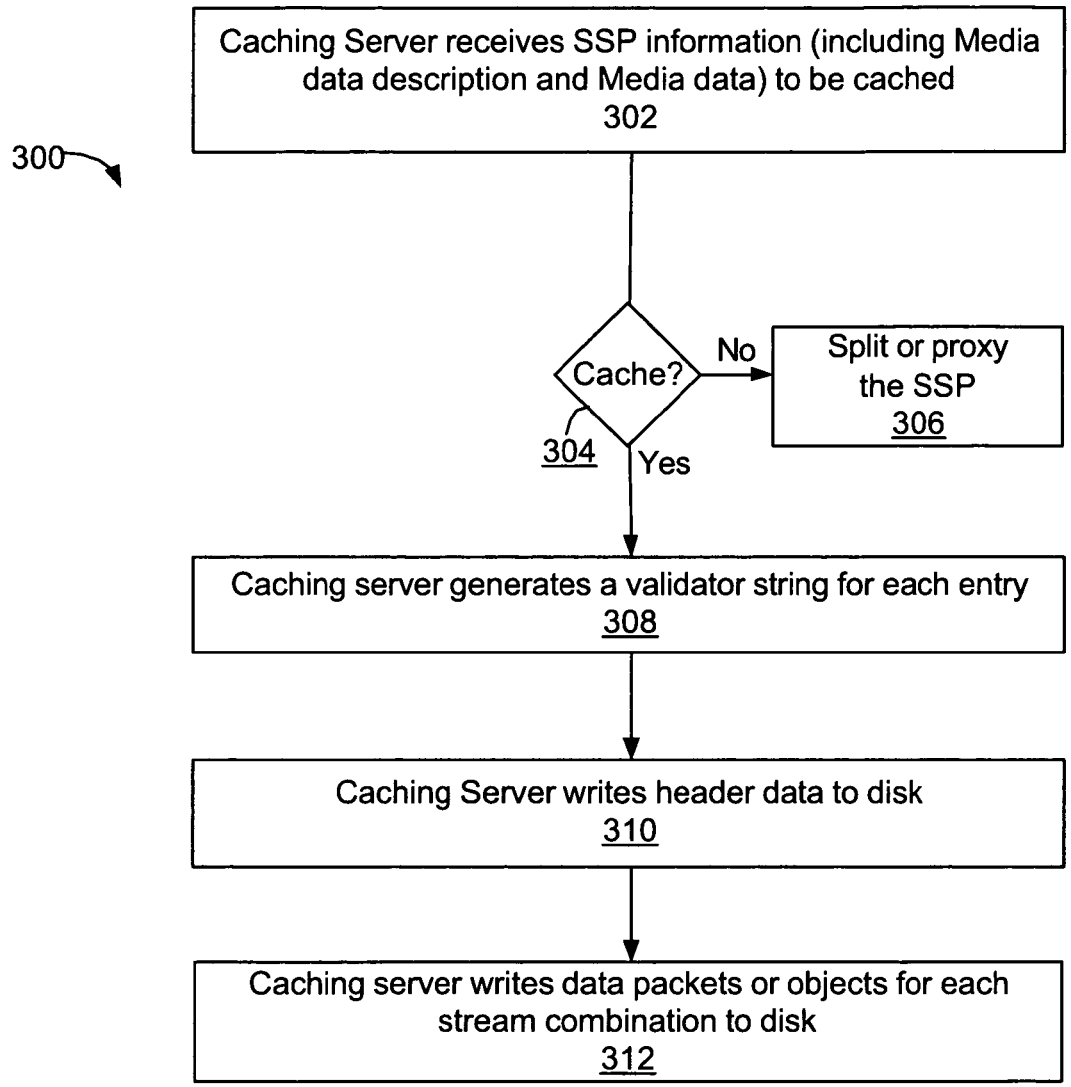
FIG. 6 is a high-level flowchart of a method of caching an SSP according to an embodiment of the present invention.

FIG. 6 is a high-level flowchart 300 of a method of caching an SSP on a cache 110 accessible by a single URL according to an embodiment of the present invention. In one embodiment, the method is performed by software modules executed by caching server system 104, or hardware modules coupled to caching server system 104, or combinations thereof. Flowchart 300 depicted in FIG. 6 is merely illustrative of an embodiment incorporating the present invention and does not limit the scope of the invention as recited in the claims.

As depicted in FIG. 6, the method is initiated at block 302 when caching server system 104 receives SSP information to be cached. As described above, the information to be cached may be received in block 302 in response to a data request received from client system 106 or the information may be pushed to caching server system 104. According to certain embodiments of the present invention, the information received at block 302 includes SSP header data (or media data description information) and SSP media data (or payload) associated with a data pointer (e.g., a URL). The SSP header information comprises information related to various attributes and properties of the SSP media data (payload), e.g., the length of the SSP media data, etc. Further details related to the SSP header information are provided below. The SSP media data (or payload) comprises information to be output to the user in response to the data request received from the user.

Caching server system 104 may receive the information to be cached in various formats. According to an embodiment of the present invention, the information to be cached may be received in the form of a file. For example, caching server 104 may receive a SSP media data file storing streaming media information corresponding to the URL of the SSP identified in a data request. The file may contain both the SSP header information and the payload data associated with the URL. Streaming SSP media data may also contain multiple media data files.

Alternatively, caching server system 104 may receive streaming SSP header information and the payload information associated with the SSP URL in the form of logical streams of packets. The SSP header information may be contained in one or more header packets received by caching server system 104 followed by a logical stream of packets containing streaming SSP media data (or payload) associated with the SSP URL. Streaming SSP media data for the SSP URL may be broken down into different encodings, e.g., ISDN encoding, DSL encoding, 56K encoding, and the like.

According to certain embodiments of the present invention, each encoding may be treated as a separate logical stream (e.g., logical streams 260 and 270). Each logical stream as a whole is a stream of packets coming from the same encoding.

The SSP header information for streaming SSP media data associated with the SSP URL may include information related to the various logical streams corresponding to different encodings for the URL. The SSP header information may also include an enumeration of the various encodings, copyright and authoring information for the SSP media data associated with the SSP URL, duration or play-time of the logical streams associated with the SSP URL, title of the SSP media data entry associated with the SSP URL, average packet size for the various encodings, and so on. The SSP header information may thus comprise information related to extrinsic properties of an entry (e.g., author information, copyright information, title information, etc.) as well as information related to intrinsic properties of the media file (e.g., number of media tracks, length of media file, encoding bit rate, Multi-purpose Internet Mail Extension ("MIME") type, and so on).

At block 304, it is determined whether the SSP is to be stored in cache 110 of caching server system 104 or not. According to certain embodiments of the invention, whether or not an SSP can be cached or not depends on the type of content and the publishing point of the content. For instance, it may be determined that while live content with a broadcast publishing point must be split, not cached, on demand content with a broadcast publishing point may be cached. Similarly, it may be determined that while it may be suitable to proxy live content with on-demand publishing point, it may be suitable to cache on demand content with on-demand publishing point. Thus, an entry having live content in an on-demand playlist is not cached. Rather, when the entry is requested by a client 106, method 300 connects to the streaming server 102 and proxies the data to the client 106 at block 306 or splits the data to multiple clients at block 306 to save bandwidth. Data is proxied or split depending on the type of data and the type of publishing point. For instance, live content in an on-demand playlist is proxied, while live content in a live or broadcast playlist is split. According to certain embodiments of the present invention, the SSP may also include one or more "wrappers." A wrapper is a piece of content that can be attached to the beginning and/or the end of an SSP. A wrapper can also interrupt an SSP and have some portion of the wrapper served before continuing with the SSP. Wrappers are a way of associating live or on-demand content with a publishing point (and thus an SSP) of either type. Thus, wrappers are SSPs that contain other SSPs, except that the type of content that a wrapper can contain is independent of the type of publishing point that is wraps.

According to certain embodiments of the invention, an on-demand SSP with on-demand wrapper content is treated as an on-demand SSP. Thus, the wrapper content is cached as part of the SSP and is served when the SSP is requested by a client 106. Further, it may be determined that if live wrapper content is included in a video on-demand SSP, the video on-demand content is cached and the live wrapper content is proxied. If a live SSP contains video on demand wrapper content, all wrapper content before the live content will be treated as video on demand and cached. This cached content is served to the client before splitting from the live connection the streaming media data server 102. If a live SSP contains live wrapper content, all the content is split.

Furthermore, certain entries may not be cached based on limitations placed by the streaming media server 102. For instance, a streaming media server 102 may prohibit a skipping operation on an SSP entry. A skipping operation may include such operations as a player indicating "Next" or "Previous." The streaming media server 102 may also prohibit other operations, such as rewind operation, fast-forward operation, pause operation, and seek operation. The method 300 may not cache such entries so that when playing the SSP to a client 106, the method 300 must connect to the streaming media server 102 and skip to an entry after that entry.

At block 308, caching server 104 generates a validator string for each entry of the SSP. A validator string is generated by caching server system 104 based upon SSP header information for the SSP media data received by caching server system 104 at block 302. According to an embodiment of the present invention, validator string 416 includes the hash of the file header and a CDL, as discussed below. In one embodiment, the file header includes an Advanced Streaming Format (ASF) header. A hash, also called a message digest, is a number generated from a string of text. The hash is substantially smaller than the text itself, and is generated by a formula in such a way that it is extremely unlikely that some other text will produce the same hash value. In certain embodiments, other methods of generating unique numbers associated with each media entry of the SSP can be used.

The portion of the SSP header information that is hashed to generate the validator string typically includes information related to distinctive features of the SSP media data, e.g., author information for the SSP media data, title information for the SSP media data, duration of the SSP media data, average packet size for the SSP media data, etc. Accordingly, both extrinsic and intrinsic properties of the SSP media data associated with a URL indicated by the SSP header information may be used to generate the validator string.

According to certain embodiments of the present invention, a Message Digest 5 (MD5) hashing technique, which is a cryptographic message digest algorithm, is used to generate the validator string. The MD5 algorithm takes as input a message of arbitrary length and produces as output a 128-bit "fingerprint" or "message digest" of the input. Thus, the MD5 algorithm is applied to the SSP header information (or portion thereof) to generate the validator string. It is believed to be computationally infeasible to produce two messages having the same message digest, or to produce any message having a given pre-specified target message digest. Thus, use of the MD5 hashing technique ensures that the validator string uniquely identifies the contents of the media data entry of the SSP associated with an URL. In certain embodiments, any algorithm that can accept an input of a random length and generate a number as an output with a mathematical certainty that "collisions", that is two sets of data map to the same number, would be rare, can be used. According to certain embodiments of the present invention, the validator string also includes a content descriptor list (CDL), which is a list of name and value pairs that are sent by the streaming media data server 102. The CDL includes information like the name of an entry of the SSP, the duration of the entry, the starting offset of this entry, and so on. The CDL enables the caching server system 104 to recognize when an SSP contains the same file more than once. For instance, an SSP may contain the following entries: 30 seconds of a first file (F1) from time 0, all of a second file (F2), and 60 seconds of F1 from time 30. The header of the SSP will contain the validator of F1 (header of F1+CDL; CDL has a start time=0, duration 30), validator of F2, and validator of F1 (header of F1+CDL; CDL has a start time=30, duration 60). Additionally, the CDL provides a way to record a pattern where the same file repeats multiple times without re-caching. For instance, in the example given above F1 is cached twice because the two entries of F1 are from different offsets in the file. In the case where a file repeats at the same offsets the CDL provides a way to ensure that the file is not cached twice. Thus, recognizing such a pattern enables the caching server 104 to cache the entry only once. Furthermore, the CDL enables the validator string 416 to uniquely identify each entry on an SSP that repeats.

Since the header information includes information (e.g., author information, title information, duration of the logical stream, etc.) that uniquely identifies each SSP entry, the value of the validator string uniquely identifies each entry of the SSP associated with the URL and stored by media data server 102. At block 310, for the SSP received at block 302, the caching server system 104 writes the header data to disk.

At block 312, the caching server 104 partitions the information received in step 302 into storage units that can be stored in cache 110. According to an embodiment of the present invention, caching server 104 partitions the information received in step 302 into objects for each logical streaming combination that can be stored in cache 110. As stated above, the information, including header information and media data (payload), may be received at block 302 in file format or as streaming packets. If the information is received in the form of packets, caching server system 104 generates objects by selecting sets of media data packets and forming objects from the packet sets. If the information is communicated to caching server system 104 in the form of a media file rather than as packets, caching server system 104 generates packets from the media file and generates objects based on sets of media data packets. Each object is configured to store a portion of the SSP media data received by caching server system 104. As indicated above, each object represents a storage unit that stores a portion of the SSP media data received by caching server system 104.

Most functions discussed in FIG. 6 are performed by data handling layer 230. In particular, actions at block 302-308 are typically performed at least in part by data handling layer 230. Actions at block 310-312 are typically performed by a file system within operating system level 220.

Each object may be assigned an object number based on the position of the portion of the SSP media data stored by the object within the logical data stream. Accordingly, if each object is configured to store SSP media data of a pre-determined performance time, an object number can be assigned to each object based upon the temporal position of the portion of the SSP media data stored by the object within the logical data stream. For example, in an embodiment of the present invention where the value of "n" is 10 seconds, the object storing SSP media data for the first 10 seconds of the logical stream may be assigned an object number of "1", the object storing SSP media data for seconds 11 through 20 may be assigned an object number of "2", and so on. Accordingly, in this embodiment (assuming that the first object is assigned a number "1"), an object assigned an object number "M" stores SSP media data for (((M−1)*n)+1) seconds through (M*n) seconds.

Figure 7:
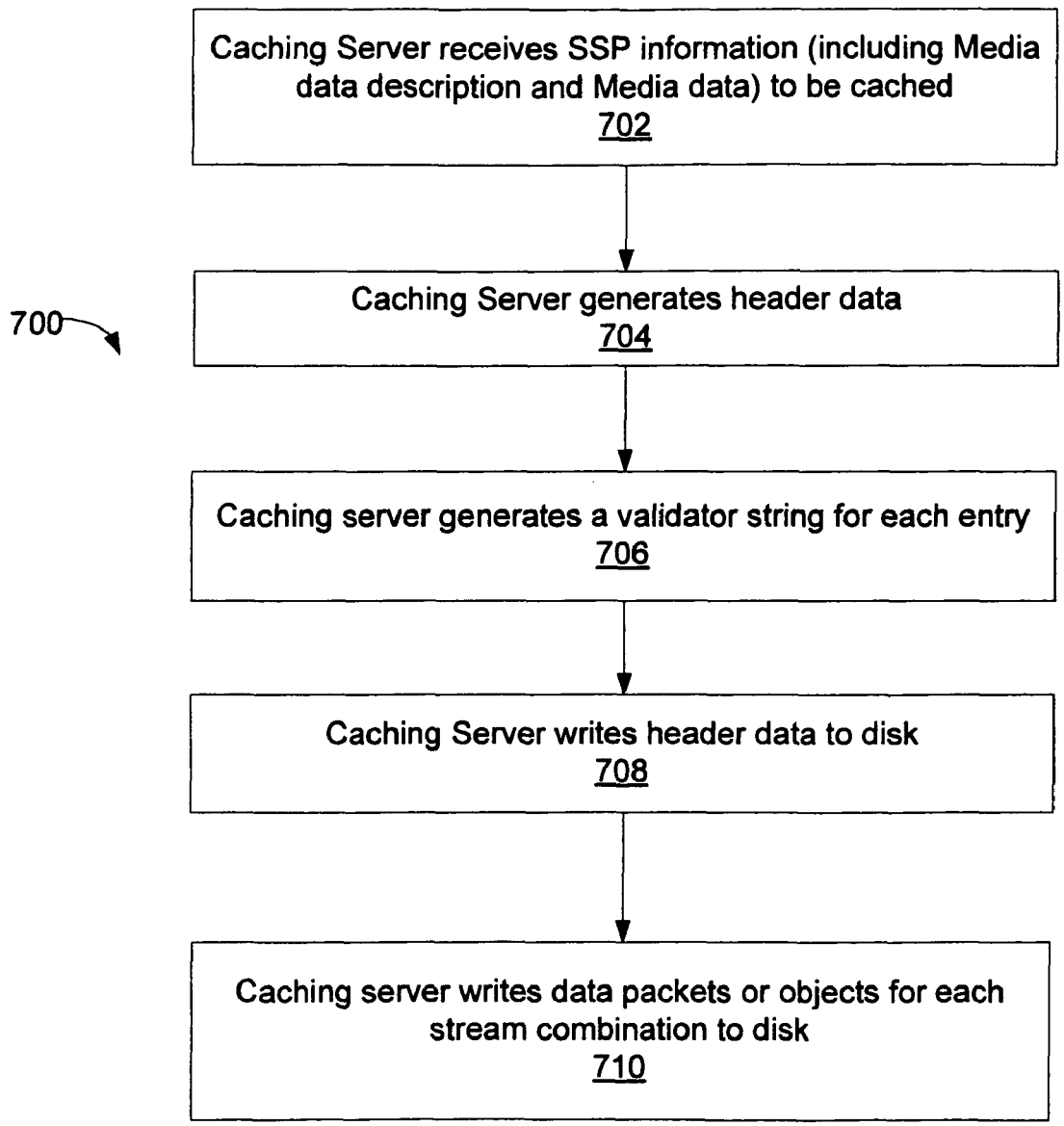
FIG. 7 is a high-level flowchart of a method of caching an SSP according to an embodiment of the present invention.

FIG. 7 is a high-level flowchart 700 of a method performed by caching server system 104 for allowing a client to create SSPs on the cache without needing a back-end streaming media data server 102 according to certain embodiments of the present invention. The method 700 involves storing multiple files, such that they are accessible using a single URL. Flowchart 700 depicted in FIG. 7 is merely illustrative of an embodiment incorporating the present invention and does not limit the scope of the invention as recited in the claims.

At block 702, the caching server 104 receives SSP information to be cached. In certain embodiments, the caching server 104 contacts one or more servers to download multiple files or source URLs to create the SSP. At block 704, for each file, header data is generated. At block 706, a validator string is generated. At block 708, the header data is written to disk. At block 710, data packets for each stream combination are written to disk.

Figure 8:
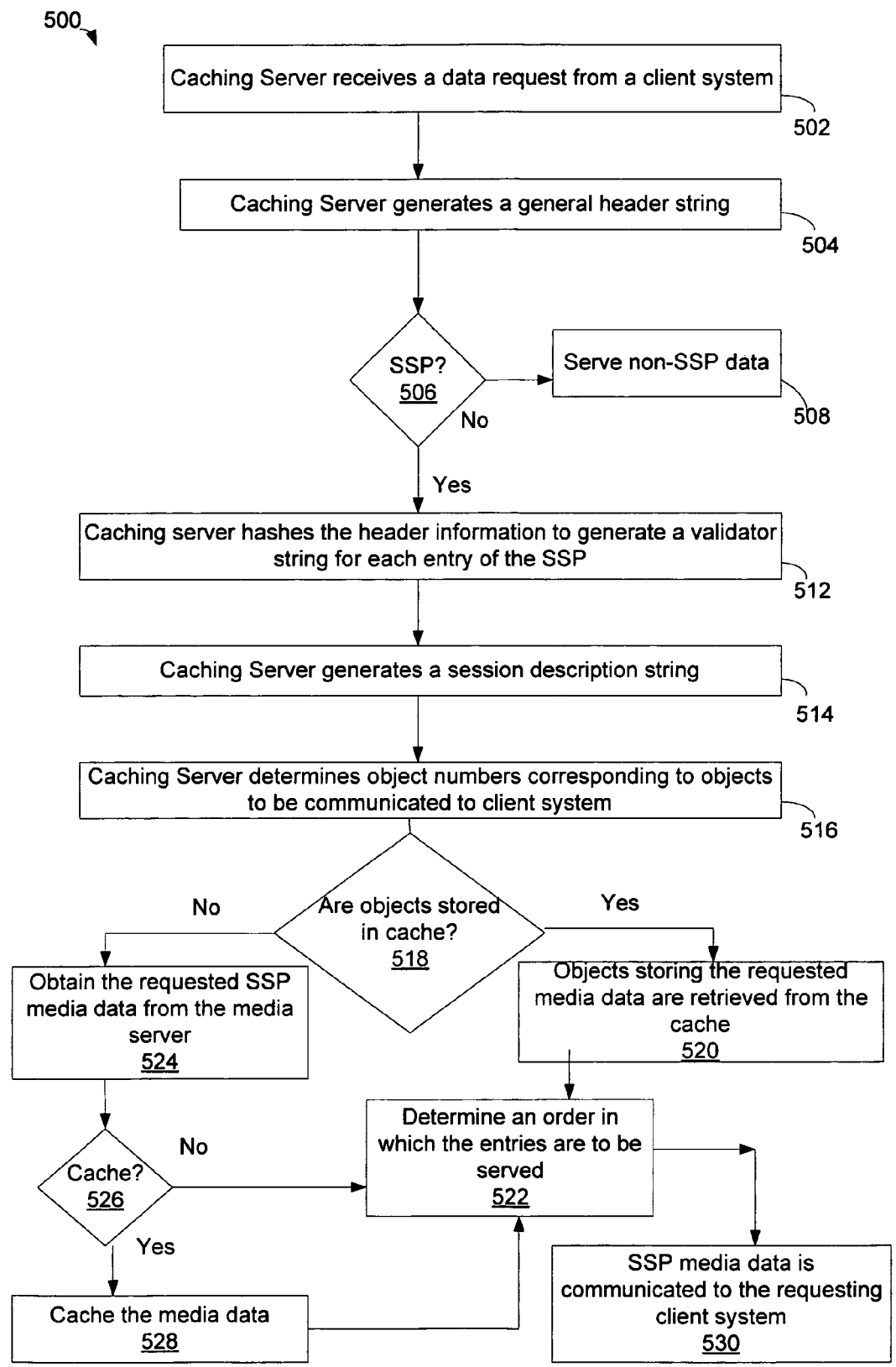
FIG. 8 is a high-level flowchart of a method performed by a caching server system for serving an SSP to a client system in response to a media data request received from the client system according to an embodiment of the present invention.

FIG. 8 is a high-level flowchart 500 of a method performed by caching server system 104 for serving SSP media data, including streaming media data, to a client system 105 in response to a media data request received from the client system according to an embodiment of the present invention. Flowchart 500 depicted in FIG. 8 is merely illustrative of an embodiment incorporating the present invention and does not limit the scope of the invention as recited in the claims.

As depicted in FIG. 8, the method 500 is initiated at block 502 when caching server system 104 receives a media data request from a client system 106. The data request may take the form of a user clicking upon a URL on a web page to request an SSP associated with the URL. The data request may also comprise information identifying the encoding to the used for streaming the requested media data to the requesting client system. Alternatively, caching server system 104 may deduce the encoding to be used based upon the attributes and characteristics of the communication link from caching server system 104 and client system 105, or based upon the media player (or any other program executing on client system 105) being used by the user to playback the streaming media data.

Upon receiving the data request from client system 106, at block 504, the caching server system 104 reads the header information for the SSP URL from the media data server storing media data for the URL requested by the data request. In one embodiment, the caching server system 104 uses a header string 400. FIG. 7 depicts the general header string 400 generated for an SSP according to an embodiment of the present invention. Header string 400 is generated by concatenating one or more strings. Header string 400 depicted in FIG. 7 includes a reserved string 402, a string 404 indicating the name of the URL (or data reference or data pointer) corresponding to the SSP, and a string representing the SSP header 406. In alternative embodiments of the present invention, other strings and/or values not depicted in FIG. 7 may also be used to generate the SSP header string. Additionally, the SSP header string may be generated using fewer strings and/or values than those depicted in FIG. 7.

Reserved string 402 may be any string such as the name of the company providing the caching server system, the name of the product performing the caching, and the like. The use of reserved string 402 is optional and not essential for the performance of the present invention.

String 404 identifies the URL (or data pointer or data reference) corresponding to the media data that is to be cached. As stated above, information identifying the URL may be included in the header information received by caching server system 104 at block 302. The URL information or a portion thereof may be used to generate string 404. String 404 may have the format "<protocol>:// <servernamex<port>/<name>", where "name" identifies the SSP.

The header string 400 is used to look up the header information associated with the media data. The header information may include such information as whether the URL is associated with an SSP, total number of entries (including wrappers) in the SSP, and so forth.

While the SSP header string 400 yields the file header for a non-SSP, it does not yield the filed header for an SSP. Thus, if, at block 504, a file header is obtained, the method 500 determines at block 506 that the data request if for a non-SSP, and the method 500 proceeds to block 508 to a method for serving non-SSP media data to the client system. Otherwise, the process 500 proceeds to block 508 to a method for serving SSP media data to the client system. Thus, method 500 ensures that a separate step is not required to obtain the file header for non-SSP.

At block 512, the caching server system 104 hashes the header information (or a portion thereof) read at block 504 and the CDL to generate a validator string for each entry of the SSP and to look up a file header for each entry. FIG. 9 depicts a file header string 410 generated for a file according to an embodiment of the present invention. As depicted in FIG. 9, file header string 410 is generated by concatenating one or more strings. File header string 410 includes the reserved string 402, the string 404 indicating the name of the SSP URL (or data reference or data pointer) corresponding to the SSP, a string 416 representing a validator of the file header, and a string 406 representing the header of the SSP. In alternative embodiments of the present invention, other strings and/or values not depicted in FIG. 9 may also be used to generate the file header string. Additionally, the file header string 410 may be generated using fewer strings and/or values than those depicted in FIG. 9. The file header string 410 is used to look up the file header information associated with each entry of the SSP.

At block 514, the caching server system 104 reads the session description for the SSP to determine how many objects are to be communicated to client system 106 in response to the particular stream combination requested by the user. This is done by generating the session description string 420. FIG. 10 depicts a session description string 420 generated for a file according to an embodiment of the present invention. Session description string 420 is generated by concatenating one or more strings.

Session description string 420 includes a reserved string 402, a string 404 indicating the name of the URL (or data reference or data pointer) corresponding to the SSP, a string 422 representing the session description, a string 416 representing a validator of the file header, and a string 424 appended to the end of the session description string 420. In alternative embodiments of the present invention, other strings and/or values not depicted in FIG. 10 may also be used to generate the file header string. Additionally, the session description string 420 may be generated using fewer strings and/or values than those depicted in FIG. 10.

At block 516, the caching server system 104, caching server system 104 determines object numbers corresponding to objects to be communicated to client system 106 in response to the data request by generating object string 430. FIG. 11 depicts an object name string 430 referencing the actual streaming data according to an embodiment of the present invention. As depicted in FIG. 11, object name string 400 is generated by concatenating one or more strings. Object name string 430 includes a reserved string 402, a string 404 indicating the name of the URL (or data reference or data pointer) corresponding to the SSP, a string 422 representing the session description, validator string 416 for the media data entry, and a string representing the object number 432 assigned to the object. In alternative embodiments of the present invention, other strings and/or values not depicted in FIG. 11 may also be used to generate the object name string. Additionally, the object name string may be generated using fewer strings and/or values than those depicted in FIG. 11.

String 432 is a textual representation of the object number assigned to a particular object being processed. As described above, each object is assigned an object number based on the position of the SSP media data stored by the object within the logical data stream. In embodiments of the present invention where each object is configured to store a portion of SSP media data of a pre-determined performance time, an object is assigned an object number object within the logical data stream.

At block 518, caching server system 104 then searches the cache 110 to determine if the objects identified at block 516 are stored in the cache 110. If caching server 104 determines that the objects are stored in the cache entry hash table, it indicates that the current version of media data requested by the user is stored in cache 110 of caching server system 104. At block 520, the objects are retrieved from cache 110.

According to certain embodiments of the invention, at block 522, method 500 determines an order in which the entries of an SSP are served at block 522. Thus, the method 500 serves the SSP entries to the clients in the same order in which the entries are received from the streaming media server 102. In some embodiments, Synchronized Media Integration Language (SMIL) elements which may be used while creating an SSP can determine the order in which various entries of the SSP are streamed to the client. Such SMIL elements include seq, switch, cklipEND, dur, excl, priorityClass, and so on. For instance, a SMIL file on a streaming media server 102 may define an SSP that plays file f1 for 20 seconds from time 0, file f2 for one hour, then file f1 for another 60 seconds from time 30.

According to certain embodiments of the invention, the caching server 104 is configured to recognize patterns when streaming the SSP from the streaming server 102 and to record patterns on disk in order to serve the SSP entries in the order received from the streaming server 102 to the client 106. Furthermore, the caching server 104 is configured to distinguish between patterns on the streaming server 102 and client generated patterns. Accordingly, the afore-mentioned SSP pattern created due to various elements and attributes in SMIL files can be generated by client action. For instance, assume that an SSP "file f1, file f2" exists on a streaming server 102. A client that plays 20 seconds of file f1, skips to file f2, plays all of file f2, skips back to file f1, seeks to 30 seconds, and plays file f1 for 60 seconds, ends up creating the same pattern. Thus, client behavior may also affect the order in which the entries are served by method 500. However, according to certain embodiments, the caching server 104 is configured to differentiate between such client generated patterns and actual server generated patterns and only record server generated patters. Furthermore, the caching server 104 may be configured to recognize a pattern that causes an SSP to play in an indefinite loop.

According to certain embodiments, server generated patterns are recognized using the CDL. As discussed above, each individual entry is identified by the MD5 hash of the ASF header and the CDL. For server generated patterns, the CDL of the entry changes based on the pattern. Thus, for the SSP that plays file f1 for 20 seconds from time 0, file f2 for one hour, then file f1 for another 60 seconds from time 30, while the ASF header for file f1 does not change, the CDL changes for each instance of file f1 in the SSP. Accordingly, for the first instance of file f1, the CDL indicates a start time of t=0 and a duration of 20, and for the second instance of file f1, the CDL indicates a start time of t=30 and a duration of 60. Because the CDL does not change for client generated patterns, the caching server 104 properly identifies a client generated patterns as such and does not record such a pattern.

According to certain embodiments of the invention, the caching server 104 also identifies a loop pattern in an SSP. Infinite loops can be very costly in terms of performance of an on-demand SSP because of the tremendous disk space required to store large amounts of data. The caching server 104 is configured to recognize an infinite loop and subsequently serve the SSP off disk while honoring the loop. One embodiment includes setting a maximum number of supported SSP entries. Once this maximum is met, the validators for each entry are examined to determine the existence of a pattern. If a loop is identified, the SSP is stored on disk with a bit indicating a loop. Thus, the method 500 streams a set number of entries before it can be determined whether there is a loop or not. The validators of duplicate entries will be present in the list of validators for the SSP. Thus, the actual streaming data on disk will not be duplicated as the lookup key generated to search for the data will be the same for 2 identical entries. For the maximum number of supported entries, a stream description object (as can be looked up using key 420) is created for each SSP entry, but each stream description object refers to the same streaming data object. For instance, for the SSP that plays file f1 for 20 seconds from time 0, file f2 for one hour, then file f1 for another 60 seconds from time 30, two session descriptions 250 are generated, with each pointing to different session data objects of the same stream. In this way, the actual streaming data (as can be looked up using key 430) is not duplicated on disk.

Thus, the caching server 104 is able to duplicate streaming server behavior and ensure that when an SSP URL is accessed from the cache, the user sees the same behavior as would be seen when streaming directly from the streaming server 102. Adding the CDL including information about start-offset, duration and so on, to the entry header achieves such correctness at minimal cost to the caching server 102 from a performance point of view.

Referring back to FIG. 8, at block 524, caching server system 104 may then obtain the requested media data from media data server and then determine whether to cache the obtained media data at block 526. If yes, then the SSP media data is to be cached, according to the method depicted in flowchart 300 in FIG. 6. Otherwise, the SSP media data is not cached. In either case, the process flows back to block 522, where the media data is then communicated or served to the requesting client system. At block 530, portions of the header data and the payload data are combined. The resulting packet is sent to the client system 106. In embodiments of the present invention, the payload data is the same as what was received from the streaming media data server 102. Further, the header data is typically protocol specific header data, i.e., the data depends upon the type of stream provided.

Thus, a method and apparatus for storing a streaming media data play list in a cache memory have been described. A streaming media data play list comprises a plurality of streaming media data entries associated with a single data pointer and the streaming media data entries comprise header data and payload data. In particular embodiments, a method for storing a streaming media data play list in a cache memory comprises receiving the streaming media data play list from a streaming media server, storing a portion of the header data in a session data object in the cache memory, and storing the payload data in a first plurality of data objects in the cache memory, such that each data object of the first plurality of data objects stores a portion of the payload data.

Because the header information includes information (e.g., start time offset, duration of the logical stream, etc.) which uniquely identifies the instance of a media data entry associated with the URL, the value of the validator string changes from one instance of a media data entry to another in an SSP, i.e., the validator string is content-sensitive and can be used to recognize and record server generated patterns in the media data playlist associated with the URL.

Although the streaming media data device, the caching system, and the client device are shown in a client server environment, they may also be peer nodes in a peer-to-peer network environment. A peer-to-peer network environment is typically layered on top of a standard network, such as a Wide-Area Network (WAN) or a Local-Area Network (LAN). Each node connected to the network may be logically coupled through the network to any of the other nodes on the network to form the peer-to-peer network environment. Each node may correspond to one or more physical devices capable of performing peer-to-peer communications with the other devices functioning as peers in the network environment. Peer-to-peer communications includes the sharing of computer resources and services by direct exchange between peer devices (or indirectly though an intermediate peer device).

Although the present invention has been described with reference to specific exemplary embodiments, it will be recognized that the invention is not limited to the embodiments described, but can be practiced with modification and alteration within the spirit and scope, of the appended claims. Accordingly, the specification and drawings are to be regarded in an illustrative sense rather than a restrictive sense. Further, while the present invention has been described using a particular combination of hardware and software, it should be recognized that other combinations of hardware and software are also within the scope of the present invention. The present invention may be implemented only in hardware or only in software or using combinations thereof.

What is claimed is:

1. A method comprising:
   receiving, at a caching server from a media data server, a streaming media data playlist comprising a plurality of streaming media data entries associated with a single data pointer, wherein the streaming media data entries are received in a recognizable pattern, the recognizable pattern defining an order for the plurality of streaming media data entries;
   determining if the recognizable pattern is one of a media data server generated pattern and a client generated pattern, wherein the determining comprises determining whether metadata of the media server generated pattern has been modified based on a plurality of streaming media data entries of the media data server generated pattern, wherein metadata of a media server generated pattern is modified based on the recognizable pattern and wherein metadata of a client generated pattern is not modified based on the recognizable pattern;

identifying, by the caching server, a loop pattern in the streaming media data playlist;

breaking a connection between the caching server and the media data server as a result of identifying the loop pattern; and if the recognizable pattern is a media data server generated pattern, storing the streaming media data play list in a cache memory in an order defined by the recognizable pattern, wherein a streaming media entry that repeats in the media data server generated pattern is stored only once, wherein an indication for the loop pattern is set by the caching server as a result of identifying the loop pattern.

2. The method recited in claim 1, wherein the data pointer is a Uniform Resource Locator (URL).

3. The method recited in claim 1, further comprising:
generating a unique validator string associated with each of the plurality of the streaming media data entries.

4. The method recited in claim 3, wherein the unique validator string comprises a content descriptor list, the content descriptor list comprising an indication of a name, a duration, and a starting offset of the corresponding streaming media data entry.

5. The method recited in claim 4, wherein the unique validator string further comprises a file header of the corresponding streaming media data entry.

6. The method recited in claim 5, further comprising:
not storing at least a portion of a streaming media entry on the cache memory if the content descriptor list indicates that the portion has previously been stored on the cache memory.

7. The method recited in claim 5, wherein the content descriptor list further comprises an indication of the pattern in which the plurality of streaming media data entries are received.

8. The method recited in claim 5, wherein the content descriptor list further comprises an indication that a particular one of the plurality of media entries play in an infinite loop.

9. The method recited in claim 1, wherein the streaming media data entries comprise header data and payload data.

10. The method recited in claim 9, further comprising:
storing the payload data in a first plurality of data objects in the cache memory, wherein each data object of the first plurality of data objects stores a portion of the payload data.

11. The method recited in claim 10, wherein storing the payload data in a first plurality of data objects in the cache memory further comprises:
determining the content type and publishing point of the payload data to be cached.

12. A method for serving streaming media data from a cache memory comprising:
identifying a loop pattern in the streaming media data;
determining, by a caching server, if a recognizable pattern in which the streaming media data entries are received is a media data server generated pattern or a client generated pattern, wherein the determining comprises determining whether metadata of the media server generated pattern has been modified based on a plurality of streaming media data entries of the media data server generated pattern, the recognizable pattern defining an order for the plurality of streaming media data entries;

if the recognizable pattern is a media data server generated pattern, storing the streaming media data entries in the caching server in an the order defined by the recognizable pattern, wherein a streaming media entry that repeats in the media data server generated pattern is stored only once, wherein an indication for the loop pattern is set by the caching server as a result of identifying the loop pattern;

retrieving data associated with a streaming media data playlist comprising the plurality of streaming media data entries, wherein the plurality of streaming media data entries is accessible by a single data pointer; and communicating the retrieved data to a client in the order defined by the recognizable pattern, wherein the retrieved data is communicated to a client in an infinite loop if the indication for the loop pattern is set for the streaming media data playlist.

13. The method recited in claim 12, further comprising:
retrieving a unique validator string associated with each of the plurality of the streaming media data entries.

14. The method recited in claim 13, wherein the unique validator string stores an indication of an order in which the streaming media data entries are served to the client.

15. The method recited in claim 14, wherein the unique validator string comprises a content descriptor list comprising a name of the streaming media data entry associated with the unique validator string, a duration of the streaming media data entry, and a starting offset of the streaming media data entry.

16. A system to communicate a streaming media playlist, the system comprising:
a processor;
a cache memory coupled to the processor, the cache memory configured to store streaming media data entries; and
a memory coupled to the processor, the memory configured to store a plurality of code modules for execution by the processor, the plurality of code modules comprising:
a code module to receive a plurality of streaming media data entries of the SSP associated with a single data pointer;
a code module to determine if a recognizable pattern in which the plurality of streaming media data entries are received is one of a media data server generated pattern and a client generated pattern, wherein the determining comprises determining whether metadata of the media server generated pattern has been modified based on a plurality of streaming media data entries of the media data server generated pattern, the recognizable pattern defining an order for the plurality of streaming media data entries; and
a code module to identify a loop pattern in the streaming media data playlist; and
a code module to store the plurality of streaming media data entries on the cache in an order defined by the recognizable pattern, if the recognizable pattern is a media data server generated pattern, wherein a streaming media data entry that repeats in the media data server generated pattern is stored only once, wherein an indication for the loop pattern is set in the cache by the code module as a result of identifying the loop pattern.

17. The system recited in claim 16, the plurality of code modules further comprising:
a code module to store a validator string corresponding to each of the plurality of streaming media data entries, wherein the validator string uniquely identifies the streaming media data entry to which it corresponds.

18. The system recited in claim 17, the plurality of code modules further comprising:
 - a code module to receive a data request from a first system requesting the SSP; and
 - a code module to retrieve, from the cache, a plurality of objects corresponding to the requested SSP.

19. A method of storing a server side playlist (SSP) comprising a plurality of media data entries in a cache, the method comprising:
 - receiving, at a caching server from a media data server, information comprising media data and header data corresponding to the plurality of media data entries, wherein the information is associated with a single data pointer;
 - generating a validator for each media data entry in the SSP, wherein the validator comprises an indication of a starting offset of the media data entry;
 - using the validators to determine if a recognizable pattern in which the information corresponding to the plurality of media data entries is received is one of a media data server generated pattern and a client generated pattern by determining whether the validators have been modified based on a plurality of streaming media data entries of the media data server generated pattern, the recognizable pattern defining an order for the plurality of streaming media data entries; and
 - determining that one or more of the plurality of media entries of the SSP play in an infinite loop based on the streaming media entries.

20. The method recited in claim 19, further comprising:
 storing the plurality of media data entries in the cache as a plurality of objects, each object in the plurality of objects storing a portion of the media data entries.

21. The method recited in claim 19, wherein the validator further comprises an indication of an order in which the streaming media data entries are communicated to a client.

* * * * *